Patented Jan. 11, 1938

2,105,037

UNITED STATES PATENT OFFICE 2,105,037

MANUFACTURE OF NICKEL CARBONYL

Charles Frederick Reed Harrison, Selley Oak, Birmingham, and Albert Edward Wallis, Clydach, England, assignors to The International Nickel Company Inc., New York, N. Y., a corporation of Delaware No Drawing. Application November 22, 1934, Serial No. 754,334. In Great Britain November 28, 1933

5 Claims. (Cl. 23—203)

This invention relates to the manufacture of nickel carbonyl from nickel matte by the action of carbon monoxide or gases containing it under pressure, and is particularly applicable to the treatment of concentrated mattes made by the top and bottom method of smelting. In the well known Mond process, it is usual for the nickel to be reduced and then treated with carbon monoxide at atmospheric pressure in order to produce nickel carbonyl, but it has been known for many years that the treatment might be conducted at elevated pressures. Recently it has been proposed to subject mattes obtained by melting to treatment at elevated pressures, the compositions of the mattes being adjusted if necessary by melting copper with them.

We have now made the discovery that provided the composition of the matte is suitable there is no need to make use of a fused matte in order to obtain high yields. To render the composition suitable, copper or iron should be present in a quantity sufficient to bind all the sulphur as cuprous sulphide or iron sulphide.

According to the invention copper or iron is mechanically mixed with a matte without fusion and the matte is then subjected to the action of carbon monoxide under pressure. This has the advantages that the process is simplified since the production of a suitable composition by mixing is simpler than the production of such a composition by fusion, and does not call for the same expenditure of fuel. The copper or iron can be added in various forms, one of which is the residue from the treatment. Another substantial advantage, therefore, is that it is possible to use the same copper or iron over and over again in cyclic manner. This gives yet a further advantage since, when the nickel has been extracted, the precious metals remain in the residue with the added metal (copper or iron) and by using the same metal several times, it becomes increasingly rich in precious metals at each circulation. When a sufficient quantity of precious metals has in this way accumulated in the circulating metal, the latter can be withdrawn from circulation and, owing to the relatively high concentration, the recovery of the precious metals can be effected in a very economical manner.

Further it might be pointed out that since the residue is mixed with fresh matte it is unnecessary to go to the trouble of extracting much more than 90% of the nickel, which is always a tedious and somewhat costly procedure. After 90% or so of the nickel has been extracted the residue is simply calcined, reduced and used again and it has been found that the residual nickel is in a form particularly suitable for extraction after such calcination and reduction.

In addition to being added as residues the copper and iron may be added in the metallic form, or in the form of oxides, or in the form of a calcined or calcined and reduced matte. If they are added in the form of oxides (whether as such or in a calcined matte), a reduction treatment is applied to the matte containing them before the carbon monoxide treatment. A temperature of from 350 to 500° C. is suitable for such reduction treatment.

It is to be understood that both copper and iron may be added simultaneously and in fact this is what happens in the circulation process, since the residues generally contain both these metals.

The preferred procedure is to calcine the residue to remove the sulphur from it and then to add the calcined residue to fresh matte. The residue is preferably reduced before being added to the matte. In this way any unextracted nickel is also returned for further carbon monoxide treatment, but if the process is carried on with due care the proportion of nickel is very small since one of the great advantages of the invention is the high proportion of nickel that is extracted.

In order that the invention may be clearly understood and readily carried into effect, some examples will now be given.

Example 1

Ground nickel sulphide matte was intimately mixed with precipitated metallic copper in such proportions that all the sulphur present in the matte could combine with the admixed copper to form $Cu_2S$. The mixture had the following average composition:— 38.5% Ni, 47.96% Cu, 11.92% S, together with small amounts of iron, cobalt and precious metals. The mixture was subjected in a high pressure vessel to the action of streaming carbon monoxide gas at 200 atmospheres and at a maximum temperature of 210° C. After 10 hours, nearly 90% of the nickel was extracted as nickel carbonyl.

The residue had a weight corresponding to two-thirds of the original matte-copper mixture and its analysis was 71.9% Cu, 6.1% Ni, and 17.8% S, together with small amounts of iron, cobalt and precious metals.

After calcination in air to remove the sulphur this residue was reduced at 360° C. with hydrogen and mixed with further suitable quantities of nickel matte and the nickel-extraction process was repeated.

Example 2

An intimate mixture of nickel sulphide matte (from the Orford process) and precipitated metallic copper was prepared having the following average composition:—36.0% Ni, 47.48% Cu, 11.50% S as well as traces of Co, Fe and precious metals. It was pressed into a number of 20-gram briquettes (as described in our corresponding application Serial No. 754,335, granted as U. S. Patent No. 2,070,079) and thereafter these briquettes were charged into a high pressure reaction vessel, and subjected to the action of streaming carbon monoxide at 175 atmospheres pressure at from 180° C. to 200° C. In 6 hours, 86% of the total nickel was volatilized from the reaction vessel as nickel carbonyl.

The residue contained 69.87% Cu, 8.96% Ni, 16.61% S together with small amounts of Fe, Co and precious metals.

This residue was calcined and reduced and used for further nickel extractions as described above.

Example 3

1000 parts by weight of sulphides of nickel containing 70.1% Ni, 1.84% Cu and 21.86% S were mixed with 400 parts of iron filings, which was enough to combine with all the sulphur to form FeS. The mixture was charged into a high pressure reaction vessel and subjected to the action of streaming carbon monoxide gas at 250 atmospheres pressure and at 250° C.

After 8 hours 88% of the total nickel in the mixture was volatilized from the reaction vessel as nickel carbonyl, together with a small amount of iron carbonyl. The residue contained 12.46% Ni, 3.18% Cu, 52.1% Fe and 29.9% S, and also contained small amounts of cobalt and precious metals. This residue was calcined, reduced in hydrogen at 400° C., and mixed with further quantities of nickel sulphides and further nickel was extracted.

The iron carbonyl formed as described above may be separated from the nickel carbonyl in any convenient way. The amount of iron carbonyl formed may be appreciably reduced if the mixture of matte and iron filings are maintained at an elevated pressure and temperature, (say 250 ats. and 250° C.) for a period of from 1 to 3 hours before allowing the carbon monoxide gases to stream through the reaction vessel.

Example 4

Calcined and reduced copper-nickel Bessemer matte was intimately mixed with uncalcined Bessemer matte in the proportion of 55 parts of the former to 45 parts of the latter. The mixture (which contained 40% of nickel) was briquetted and charged into a reaction vessel where it was subjected to the action of streaming carbon monoxide gases at 200 atmospheres pressure and at 200° C.

In 5 hours 84% and in 10 hours 91% of the total nickel was extracted as nickel carbonyl.

The residue containing cuprous sulphide, and a little nickel, precious metal, etc., was calcined and used again in cyclic manner.

We claim:—

1. The process of manufacturing nickel carbonyl from nickel matte constituted of sulphides which comprises forming an unfused, intimate mechanical mixture of nickel matte with a multitude of separated particles of a metal of the group consisting of copper and iron in a state of fine division to combine chemically with substantially all of the sulphur evolved by said sulphides, said mixture having said multitude of separated particles so distributed throughout the same as to provide metal particles within the zones of chemical reaction of substantially all of the particles of said sulphides, subjecting said unfused mixture containing said distributed multitude of separated particles to the action of carbon monoxide under pressure whereby substantially all of said sulphur combines chemically with said distributed multitude of metal particles to form cuprous sulphide or ferrous sulphide and to facilitate the extraction of practically all of said nickel as nickel carbonyl.

2. The process of manufacturing nickel carbonyl from nickel matte constituted of sulphides which comprises mechanically mixing matte with a multitude of separated particles of at least one metal of the group consisting of iron and copper in a state of fine division to combine chemically with substantially all of the sulphur to form an intimate, unfused, mechanical mixture in which said multitude of separated particles is so distributed throughout the same that said particles are in chemical reactive zones of substantially all of the particles of said sulphides, charging said unfused mixture to a nickel extractor, and subjecting said unfused mixture containing said distributed multitude of separated particles to the action of carbon monoxide under pressure whereby substantially all of said sulphur combines chemically with said distributed multitude of separated metal particles to form cuprous sulphide or ferrous sulphide and to facilitate the extraction of practically all of said nickel.

3. The process of manufacturing nickel carbonyl from nickel matte constituted of sulphides which comprises forming an unfused, intimate, mechanical mixture of nickel matte with a multitude of separated particles of a metal of the group consisting of copper and iron in a state of fine division to combine chemically with substantially all the sulphur evolved by said sulphides, said mixture having said multitude of separated particles so distributed throughout the same as to provide metal particles within the zones of chemical reaction of substantially all of the particles of said sulphides, subjecting said unfused mixture containing said distributed multitude of separated particles to the action of carbon monoxide under pressure to form cuprous sulphide or ferrous sulphide to facilitate the separation of said nickel from a residue containing precious metals and sulphides of said metal, calcining said residue to remove substantially all of the sulphur of said sulphides and reusing said calcined residue in the first step hereof whereby precious metals included in a nickel matte are concentrated.

4. The process of manufacturing nickel carbonyl from nickel matte constituted of sulphides which comprises forming an unfused, intimate mechanical mixture of nickel matte with a multitude of separated particles of iron in a state of fine division to combine chemically with substantially all of the sulphur evolved by said sulphides, said mixture having said multitude of separated particles of iron so distributed throughout the same as to provide iron particles within the zones of chemical reaction of substantially all of the particles of said sulphides, and subjecting said unfused mixture containing said distributed multitude of separated particles to the action of carbon monoxide at an elevated temperature and an elevated pressure whereby substantially all of said sulphur combines chemically with said distributed multitude of separated iron particles to form ferrous sulphide and to facilitate the extraction of practically all of said nickel as nickel carbonyl after a period of about several hours.

5. The process of manufacturing nickel carbonyl from nickel matte constituted of sulphides which comprises forming an unfused, intimate mechanical mixture of nickel matte with a multitude of separated particles of copper in a state of fine division to combine chemically with substantially all of the sulphur evolved by said sulphides, said mixture having said multitude of particles of copper so distributed throughout the same as to provide copper particles within the zones of chemical reaction of substantially all of the particles of said sulphides, and subjecting said unfused mixture containing said distributed multitude of separated particles to the action of streaming carbon monoxide at an elevated temperature and an elevated pressure whereby substantially all of said sulphur combines chemically with said distributed multitude of separated copper particles to form cuprous sulphide and to facilitate the extraction of practically all of said nickel as nickel carbonyl after a period of about several hours.

CHARLES F. R. HARRISON.
ALBERT EDWARD WALLIS.